United States Patent Office 3,649,565
Patented Mar. 14, 1972

3,649,565
DEHYDROGENATION METHOD AND CATALYTIC COMPOSITE FOR USE THEREIN
Frederick C. Wilhelm, Arlington Heights, Ill., assignor to Universal Oil Products Company, Des Plaines, Ill.
No Drawing. Continuation-in-part of application Ser. No. 835,218, June 20, 1969. This application Oct. 20, 1969, Ser. No. 867,861
Int. Cl. B01j 11/08
U.S. Cl. 252—466 PT       6 Claims

ABSTRACT OF THE DISCLOSURE

Dehydrogenatable hydrocarbons are dehydrogenated by contacting them at dehydrogenation conditions with a catalytic composite comprising a combination of catalytically effective amounts of a platinum group component and a lead component with a porous carrier material. A specific example of the catalytic composite disclosed herein is a combination of a platinum component, a lead component and an alkali or alkaline earth component with a porous carrier material wherein the platinum and lead components are uniformly distributed throughout the porous carrier material, wherein the composite contains about 0.01 to about 2 wt. percent of platinum and about 0.01 to about 5 wt. percent of the alkali metal or alkaline earth metal and wherein the lead component is present in an amount sufficient to result in an atomic ratio of lead to platinum of about 0.05:1 to about 0.9:1.

CROSS-REFERENCES TO RELATED APPLICATIONS

This application is a continuation-in-part of my prior application entitled "Hydrocarbon Conversion Process and Catalytic Composite for Use Therein," Ser. No. 835,218, filed June 20, 1969 and now abandoned.

The subject of the present invention is, broadly, an improved method for dehydrogenating a dehydrogenatable hydrocarbon to produce a hydrocarbon product containing the same number of carbon atoms but fewer hydrogen atoms. In another aspect, the present invention involves a method of dehydrogenating normal praffin hydrocarbons containing 4 to 30 carbon atoms per molecule to the corresponding normal mono-olefin with minimum production of side products. In yet another aspect, the present invention relates to a novel catalytic composite comprising a combination of catalytically effective amounts of a platinum group component, a lead component and an alkali or alkaline earth component with a porous carrier material which composite has highly beneficial characteristics of activity, selectivity, and stability when it is employed in the dehydrogenation of dehydrogenatable hydrocarbons such as aliphatic hydrocarbons, naphthene hydrocarbons, and alkylaromatic hydrocarbons.

The conception of the present information followed from my search for a novel catalytic composite possessing a hydrogenation-dehydrogenation function, a controllable cracking function, and superior conversion, selectivity and stability characteristics when employed in hydrocarbon conversion processes that have traditionally utilized dual-function catalytic composites. In my prior application, I disclosed a significant finding with respect to a catalytic composite meeting these requirements. More specifically, I determined that an ingredient which has heretofore been thought to have a substantial adverse affect on a platinum-containing catalyst can be utilized under certain conditions, to beneficially interact with the platinum component with a resulting marked improvement in the performance of such a catalyst. This ingredient was lead. Now I have ascertained that a catalytic composite comprising a combination of a platinum group component and a lead component with a porous carrier material can have superior activity, selectivity and stability characteristics when it is employed in a dehydrogenation process if the metallic components are uniformly distributed throughout the porous carrier material and if the amount of lead contained therein is carefully selected as a function of the amount of the platinum group metal utilized. Moreover, I have discerned that a particularly preferred catalytic composite contains not only a platinum group component and a lead component, but also an alkali or alkaline earth component.

The dehydrogenation of dehydrogenatable hydrocarbons is an important commercial process because of the great and expanding demand for dehydrogenated hydrocarbons for use in the manufacture of various chemical products such as detergents, plastics, synthetic rubbers, pharmaceutical products, high octane gasoline, perfumes, drying oils, ion-exchange resins, and various other products well known to those skilled in the art. One example of this demand is in the manufacture of high octane gasoline by using $C_3$ and $C_4$ mono-olefins to alkylate isobutane. Another example of this demand is in the area of dehydrogenation of normal paraffin hydrocarbons to produce normal mono-olefins having 4 to 30 carbon atoms per molecule. These normal mono-olefins can, in turn, be utilized in the synthesis of a vast number of other chemical products. For example, derivatives of normal mono-olefins have become of substantial importance to the detergent industry where they are utilized to alkylate an aromatic, such as benzene, with resultant transformation of the product arylalkane into a wide variety of biodegradable detergents such as the alkylaryl sulfonate type of detergent which is most widely used today for household, industrial, and commercial purposes. Still another large class of detergents produced from these normal mono-olefins are the oxyalkylated phenol derivatives in which the alkyl phenol base is prepared by the alkylation of phenol with these normal mono-olefins. Still another type of detergents produced from these normal mono-olefins are the biodegradable alkylsulfates formed by the direct sulfation of the normal mono-olefin. Likewise, the olefin can be subjected to direct sulfonation with sodium bisulfite to make biodegradable alkylsulfonates. As a further example, these mono-olefins can be hydrated to produce alcohols which then, in turn, can be used to produce plasticizers and/or synthetic lube oils.

Regarding the use of products made by the dehydrogenation of alkylaromatic hydrocarbons, these find wide application in industries including the petroleum petrochemical, pharmaceutical, detergent, plastic industries, and the like. For example, ethylbenzene is dehydrogenated to produce styrene which is utilized in the manufacture of polystyrene plastics, styrene-butadiene rubber, and the like products. Isopropylbenzene is dehydrogenated to form alpha-methylstyrene which, in turn, is extensively used in polymer formation and in the manufacture of drying oils, ion exchange resins, and the like material.

Responsive to this demand for these dehydrogenation products, the art has developed a number of alternative methods to produce them in commercial quantities. One method that is widely utilized involves the selective dehydrogenation of dehydrogenatable hydrocarbon by contacting the hydrocarbon with a suitable catalyst at dehydrogenation conditions. As is the case with most catalytic procedures, the principal measure of effectiveness for this dehydrogenation method involves the ability to perform its intended function with minimum interference of side reactions for extended periods of time. The analytical terms used in the art to broadly measure how well a particular catalyst performs its intended functions in a particular hydrocarbon conversion reaction are activity, selectivity, and stability, and for purposes of discussion here these terms are generally defined for a given reactant as follows: (1) activity is a measure of the catalyst's ability to convert the hydrocarbon reactant into products at a specified severity level where severity level means the conditions used—that is, the temperature, pressure, contact time, and presence of diluents such as $H_2$; (2) selectivity usually refers to the amount of desired product or products obtained relative to the amount of the reactant converted; (3) stability refers to the rate of change with time of the activity and selectivity parameters—obviously the smaller rate implying the more stable catalyst. More specifically, in a dehydrogenation process, activity commonly refers to the amount of conversion that takes place for a given dehydrogenatable hydrocarbon at a specified severity level and is typically measured on the basis of disappearance of the dehydrogenatable hydrocarbon; selectivity is typically measured by the amount, calculated on a mole percent of converted dihydrogentable hydrocarbon basis, of the desired dehydrogenated hydrocarbon obtained at the particular severity level; and stability is typically equated to the rate of change with time of activity as measured by disappearance of the dehydrogenatable hydrocarbon and of selectivity as measured by the amount of desired hydrocarbon produced. Accordingly, the major problem facing workers in the hydrocarbon dehydrogenation art is the development of a more active and selective catalytic composite that has good stability characteristics.

I have now found a catalytic composite which possesses improved activity, selectivity, and stability when it is employed in a process for the dehydrogenation of dehydrogenatable hydrocarbons. In particular, I have determined that a combination of catalytically effective amounts of a platinum group component and a lead component with a porous, refractory carrier material can enable the performance of a dehydrogenation process to be substantially improved. Moreover, particularly good results are obtained when this composite is combined with an alkali or alkaline earth component and utilized to produce dehydrogenated hydrocarbons containing the same carbon structure as the reactant hydrocarbon but fewer hydrogen atoms. This last composite is particularly useful in the dehydrogenation of long chain normal paraffins to produce the corresponding normal mono-olefin with minimization of side reactions such as skeletal isomerization, aromatization, and cracking.

It is, accordingly, one object of the present invention to provide a novel method for the dehydrogenation of dehydrogenatable hydrocarbons utilizing a catalytic composite comprising a platinum group component and a lead component combined with a porous carrier material. A second object is to provide a novel catalytic composite having superior performance characteristics when utilized in a dehydrogenation process. Another object is to provide an improved method for the dehydrogenation of normal paraffin hydrocarbons to produce normal mono-olefins which method minimizes undesirable side reactions such as cracking, skeletal isomerization, and aromatization.

In brief summary, one embodiment of the present invention involves a method for dehydrogenating a dehydrogenatable hydrocarbon which comprises contacting the hydrocarbon with a catalytic composite containing a platinum group component and a lead component combined with a porous carrier material at dehydrogenation conditions. The catalytic composite contains the platinum group component in an amount, calculated on an elemental basis, of about 0.01 to about 2 wt. percent and the lead component in an amount sufficient to result in an atomic ratio of lead to platinum group metal of about 0.05:1 to about 0.9:1. Moreover, both components are uniformly dispersed throughout the porous carrier material.

A second embodiment relates to the dehydrogenation method described in the first embodiment wherein the dehydrogenatable hydrocarbon is an aliphatic compound containing 2 to 30 carbon atoms per molecule.

A third embodiment comprehends a catalytic composite comprising a combination of a platinum group component, a lead component, and a alkali or alkaline earth component with an alumina carrier material. These components are present in amounts sufficient to result in the catalytic composite containing, on an elemental basis, about 2 wt. percent platinum group metal, about 0.01 to about 5 wt. percent of the alkali metal or alkaline earth metal, and lead in an amount sufficient to result in an atomic ratio of lead to platinum group metal of about 0.05 to about 0.9:1. Moreover, the platinum group and lead components are uniformaly dispersed in the carrier material.

Another embodiment pertains to a method for dehydrogenating a dehydrogenatable hydrocarbon which comprises contacting the hydrocarbon with the catalytic composite described in the third embodiment at dehydrogenation conditions.

Other objects and embodiments of the present invention involve specific details regarding essential and preferred catalytic ingredients, preferred concentration of components in the composite, suitable methods of composite preparation, suitable dehydrogenatable hydrocarbons, operating conditions for use in the dehydrogenation process, and the like particulars. These are hereinafter given in the following detailed discussion of each of these facets of the present invention.

Regarding the dehydrogenatable hydrocarbon that is subjected to the method of the present invention, it can, in general, be an organic compound having 2 to 30 carbon atoms per molecule and containing at least 1 pair of adjacent carbon atoms having hydrogen attached thereto. That is to say, it is intended to include within the scope of the present invention, the hydrogenation of any organic compound capable of being dehydrogenated to produce products containing the same number of carbon atoms but fewer hydrogen atoms, and capable of being vaporized at the dehydrogenation temperatures used herein. More particularly, suitable dehydrogenatable hydrocarbons are: aliphatic compounds containing 2 to 30 carbon atoms per molecule, alkylaromatic hydrocarbons where the alkyl group contains 2 to 6 carbon atoms, and naphthenes or alkyl-substituted naphthenes. Specific examples of suitable dehydrogenatable hydrocarbons are: (1) alkanes such as ethanes, propane, n-butane- isobutane, n-pentane, isopentane, n-hexane, 2-methylhexane, 2-methylpentane, 2,2-dimethylbutane, n-heptane, 2-methylhexane, 2,2,3-trimethylbutane, and the like compounds; (2) naphthenes such as cyclopentane, cyclohexane, methylcyclopentane, ethylcyclopentane, n-propylcyclopentane, 1,3-dimethylcyclohexane, and the like compounds; and, (3) alkylaromatics such as ethylbenzene, n-butylbenzene, 1,3,5-triethylbenzene, isopropylbenzene, isobutylbenzene, ethylnaphthalene, and the like compounds.

In a preferred embodiment, the dehydrogenatable hydrocarbon is a normal paraffin hydrocarbon having about 4 to about 30 carbon atoms per molecule. For example, normal paraffin hydrocarbons containing about 10 to 15 carbon atoms per molecule are dehydrogenated by the subject method to produce the corresponding normal mono-olefin which can, in turn, be alkylated with benzene and sulfonated to make alkylbenzene sulfonate detergents having superior biodegradability. Likewise, n-alkanes having 12 to 18 carbon atoms can be dehydrogenated to the corresponding normal mono-olefin which, in turn, can be sulfated or sulfonated to make excellent detergents. Similarly, n-alkane having 6 to 10 carbon atoms can be dehydrogenated to form the corresponding mono-olefin which can, in turn, be hydrated to produce valuable alcohols. Preferred feed streams for the manufacture of detergent intermediates contains a mixture of 4 or 5 adjacent normal paraffin homologues such as $C_{10}$ to $C_{13}$, $C_{11}$ to $C_{14}$, $C_{11}$ to $C_{15}$, and the like mixtures.

An essential feature of the present invention involves the use of a catalytic composite comprising a combination of catalytically effective amounts of a platinum group component and a lead component with a porous carrier material. In a preferred embodiment, this catalytic composite also contains an alkali or alkaline earth component.

Considering first the porous carrier material utilized in the present invention, it is preferred that the material be a porous, adsorptive, high-surface area support having a surface area of about 25 to about 500 m.$^2$/gm. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including those synthetically prepared and naturally occurring, which may or may not be acid treated, for example, Attapulgus clay, china clay, diatomaceouus earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc. (5) crystalline aluminosilicates such as naturally occurring or synthetically prepared mordenite and/or faujasite, either in the hydrogen form or in a form which has been treated with multivalent cations; and, (6) combination of one or more elements from these groups. The preferred porous carrier materials for use in the present invention are refractory inorganic oxides, with best results obtained with an alumina carrier material. Suitable alumina materials are the crystalline aluminas known as the gamma-, eta-, and theta-alumina, with gamma- or eta-alumina giving best results. In addition, in some embodiments the alumina carrier material may contain minor proportions of other well known refractory inorganic oxides such as silica, zirconia, magnesia, etc.; however, the preferred support is substantially pure gamma- or eta-alumina. Preferred carrier materials have an apparent bulk density of about 0.3 to about 0.7 gm./cc. and surface area characteristics such that the average pore diameter is about 20 to 3000 angstoms, the pore volume is about 0.1 to about 1 ml./gm. and the surface area is about 100 to about 500 m.$^2$/gm. In general, best results are typically obtained with a gamm-alumina carrier material which is used in the form of spherical particles having: a relatively small diameter (i.e., typically about $1/16$ inch), an apparent bulk density of about 0.5 gm./cc., a pore volume of about 0.4 ml./gm., and a surface area of about 175 m.$^2$/gm.

The preferred alumina carrier material may be prepared in any suitable manner and may be synthetically prepared or natural occcurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the composite of the present invention is a lead component. This component may be present in the composite as an elemetal metal or as a chemical compound such as the oxide, sulfide, halide oxychloride, aluminate, etc. Although it is not intended to restrict the present invention by this explanation, it is believed that best results are obtained when the lead component is present in the composite in an oxidation state above that of the elemental metal. That is, it is believed that particularly good results are obtained when the lead component exists in the catalytic composite in the +2 oxidation state. The preferred method of preparation of the catalytic composite of the present invention is believed to result in the composite containing the lead component in an oxidation state above that of the elemental metal. The lead component may be incorporated into the catalytic composite in any suitable manner known to effectively disperse this component throughout the carrier material or to result in this condition. Thus, this incorporation may be accomplished by coprecipitation or cogellation with the porous carrier material, ion-exchange with the carrier material while it is in a gel state, or impregnation of the carrier material at any stage in its preparation. It is to be noted that it is intended to include within the scope of the present invention all conventional methods for incorporating a metallic component in a catalyst composite which results in a uniform distribution of the metallic component throughout the associated carrier material. One preferred method of incorporating the lead component to the catalytic composite involves coprecipitating the lead component during the preparation of the preferred refractory oxide carrier material. Typically, this involves the addition of a suitable, soluble, decomposable lead compound to the alumina hydrosol, and then combining the hydrosol with a suitable gelling agent and dropping the resulting mixture into an oil bath as explained in detail hereinbefore. After drying and calcining the resuling gelled carrier material, there is obtained an intimate combination of alumina and lead oxide, which combination has the lead component uniformly dispersed throughout the alumina. Another preferred method of incorporating the lead component into the catalytic composite involves the utilization of a soluble, decomposable compound of lead to impregnate the porous carrier material. In general, the solvent used in this preferred impregnation step is selected on the basis of its capability to dissolve the desired lead compound and is typically an aqueous solution. Hence, the lead component may be added to the carrier material by commingling the latter with an aqueous solution of a suitable lead salt or water-soluble compound of lead such as lead acetate, lead basic acetate, lead bromate, lead bromide, lead chlorate, lead perchlorate, lead chloride, lead citrate, lead ethylsulfate, lead formate, lead nitrate, lead basic nitrate, lead nitrite, and the like compounds. Best results are ordinarily obtained with a solution of lead nitrate and nitric acid. In general, the lead component can be impregnated either prior to, simultaneously with, or after the platinum group metallic component is added to the carrier material. However, I have obtained excellent results by impregnating the lead component simultaneously with the platinum group component. In fact, I have determined that a preferred impregnation solution contains chloroplatinic acid, nitric acid, and lead nitrate. Following the incorporation of the lead component, the resulting composite is usually dried and calcined as explained hereinafter.

Regardless of which lead compound is used in the preferred impregnation step, it is important that the lead component be uniformly distributed throughout the carrier material. In order to achieve this objective, it is necessary to maintain the pH of the impregnation solution in a range of about 1 to about 7 and to dilute the solution to a volume which is substantially in excess to the volume of the carrier material which is impregnated. It is preferred to use a volume ratio of impregnation solution to carrier material of at least 1.5:1 to about 2:1 to about 3:1 or more. Similarly, a relatively long contact time should be used during this impregnation step ranging from about 0.25 hour up to about 0.5 hour or more. The carrier material is likewise preferably constantly agitated during the impregnation step.

As indicated above, the catalyst of the present invention also contains a platinum group component. Although the process of the present invention is specifically directed to the use of a catalytic composite containing platinum, it is intended to include other platinum group metals such as palladium, rhodium, ruthenium, osmium, and iridium. The platinum group component such as platinum may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2 wt. percent of the final catalytic composite, calculated on an elemental basis. Excellent results are obtained when the catalyst contains about 0.05 to about 1 wt. percent of the platinum group metal. The preferred platinum group component is platinum or a compound of platinum. Good results are also obtained when the platinum group component is palladium or a compound of palladium.

The platinum group component may be incorporated in the catalytic composite in any suitable manner such as coprecipitation or cogellation with the preferred carrier material, or ion-exchange or impregnation thereof. The preferred method of preparing the catalyst involves the utiization of a water-soluble, decomposable compound of a platinum group metal to impregnate the carrier material. For example, the platinum group component may be added to the carrier by commingling the latter with an aqueous solution of chloroplatinic acid. Other water-soluble compounds of platinum may be employed in impregnation solutions and include ammonium chloroplatinate, bormoplatinic acid, platinum chloride, platinum tetrachloride hydrate, platinum dichlorocarbonyldichloride, dinitrodiaminoplatinum, palladium chloride, palladium nitrate, and the like compounds. Hydrogen chloride or nitric acid is also generally added to the impregnation solution in order to aid in the distribution of the metallic component throughout the carrier material. In addition, it is generally preferred to impregnate the carrier material after it is calcined in order to minimize the risk of washing away the valuable platinum group compound. As indicated above, best results are obtained when the platinum group component is added to the carier material at the same time as the lead component. Following incorporation of the platinum group component, the resulting composite is typically dried and calcined as explained hereinafter.

Regarding the amount of the lead component contained in the compoiste, I have found that it is essential to fix the amount of the lead component as a function of the amount of the platinum group component contained in the composite. More specifically, I have observed that the beneficial interaction of the lead component with the platinum group component is only obtained when the lead component is present, on an atomic basis, in an amount substantially less than the platinum group component. Quantitatively, the amount of the lead component is preferably sufficient to provide an atomic ratio of lead to platinum group metal of about 0.05:1 to about 0.9:1, with best results obtained at an atomic ratio of about 0.1:1 to about 0.75:1. The criticalness associated with this atomic ratio limitation is apparent when an attempt is made to convert hydrocarbons with a catalyst having an atomic ratio of lead to platinum of 1:1. In this latter case, I observed substantial deactivation of the platinum component by the lead component. Accordingly, it is an essential feature of the present invention that the amount of the lead component is chosen as a function of the amount of the platinum group component in order to insure that the atomic ratio of these components in the resulting catalyst is within the stated range. Specific examples of especially preferred catalytic compsites are as follows: (1) a catalytic composite comprising 1.0 wt. percent platinum and 0.5 wt. percent lead combined with an alumina carrier material, (2) a catalytic composite comprising 0.75 wt. percent platinum, 0.2 wt. percent lead combined with an alumina carrier material, (3) a catalytic composite comprising 0.375 wt. percent platinum and 0.10 wt. percent lead combined with an alumina carrier material, (4) a catalytic compoiste comprising 0.2 wt. percent platinum and 0.1 wt. percent lead combined with an alumina carrier material, and, (5) a catalytic composite comprising .5 wt. percent platinum and 0.2 wt. percent lead combined with an alumina carrier material.

As indicated above, a preferred embodiment of the present invention involves use of a catalytic composite containing an alkali or alkaline earth component. More specifically, this component is selected from the group consisting of the compounds of the alkali metals—cesium, rubidium, potassium, sodium, and lithium—and of the alkaline earth metals—calcium, strontium, barium, and magnesium. This component may exist within the catalytic composite as a relatively stable compound such as the oxide or sulfide or in combination with one or more of the other components of the composite, or in combination with an alumina carrier material such as in the form of a metal aluminate. Since, as is explained hereinafter, the composite containing the alkali or alkaline earth is always calcined in an air atmosphere before use in the conversion of hydrocarbons, the most likely state this component exists in during use in dehydrogenation is the metallic oxide. Regardless of what precise form in which it exists in the composite, the amount of this component utilized is preferably selected to provide a composite containing about 0.01 to about 5 wt. percent of the alkali or alkaline earth metal, and more preferably about 0.05 to about 2.5 wt. percent. Best results are ordinarily achieved when this component is a compound of lithium or potassium.

This alkali or alkaline earth component may be combined with the porous carrier material in any manner known to those skilled in the art such as by impregnation, coprecipitation, physical admixture, ion exchange, etc. However, the preferred procedure involves impregnation of the carrier material either before or after it is calcined and either before, during, or after the other components are added to the carrier material. Best results are ordinarily obtained when this component is added after the platinum group and lead components because it serves to neutralize the acid used in the preferred impregnation procdeure for incorporation of these components. In fact, it is preferred to add the platinum group and lead components, dry and oxidize the resulting composite, then treat the oxidized composite with steam in order to remove residual acidity, and then add this component. Typically, the impregnation of the carrier material is performed by contacting same with a solution of a suitable decomposable compound or salt of the desired alkali or alkaline earth metal. Hence, suitable compounds include the halides, sulfates, nitrates, acetates, carbonates, phosphates, and the like compounds. For example, excellent results are obtained by impregnating the carrier material, after the platinum group component and lead component have been combined therewith, with an aqueous solution of lithium nitrate or potassium nitrate. Following the incorporation of this component, the resulting composite is preferably dried and calcined in an air atmosphere as explained hereinafter.

Regardless of the details of how the components of the catalyst are composited with the carrier material, the resulting composite, after one or more of the components are added thereto, generally will be dried at a temperature of about 200° F. to about 600° F. for a period of about 2 to 24 hours or more and finally calcined at a temperature of about 600° F. to about 1100° F. in an air atmosphere for a period of about 0.5 to 10 hours, preferably about 1 to about 5 hours in order to substantially convert the metallic components to the oxide form. When acidic components are present in any of the reagents used to effect incorporation of any one of the components of the subject composite, it is a good practice to subject the resulting composite to a high temperature treatment with steam, either after or before the calcination step described above, in order to remove as much as possible of the undesired acidic component. For example, when the platinum group component is incorporated by impregnating the carrier material with chloroplatinic acid, it is preferred to subject the resulting composite to a high temperature treatment with steam in order to remove as much as possible of the undesired chloride.

It is preferred that the resultant calcined catalytic composite be subjected to a substantially water-free reduction prior to its use in the conversion of hydrocarbons. This step is designed to insure a uniform and finely divided dispersion of the metallic components throughout the carrier material. Preferably, substantially pure and dry hydrogen (i.e., less than 2 vol. p.p.m. $H_2$) is used as the reducing agent in this step. The reducing agent is contacted with the calcined composite at a temperature of about 800° F. to about 1200° F. and for a period of time of about 0.5 to 10 hours or more, effective to substantially reduce the platinum group component to the elemental state. As indicated hereinbefore, the lead component is believed to remain in a positive oxidation state during this reduction step. This reduction treatment may be performed in situ as parts of a start-up sequence if precautions are taken to predry the plant to a substantially water-free state and if substantially water-free hydrogen is used.

Although it is not essential the resulting reduced catalytic composite may, in some cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture containing a mole ratio of $H_2$ to $H_2S$ of about 10:1 at conditions sufficient to effect the desired incorporation of sulfur, generally including a temperature ranging from about 50° F. up to about 1100° F. or more. This presulfiding step can be performed in situ or ex situ.

According to the method of the present invention, the dehydrogenatable hydrocarbon is contacted with a catalytic composite of the type described above in a dehydrogenation zone at dehydrogenation conditions. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, the hydrocarbon feed stream is preheated by any suitable heating means to the desired reaction temperature and then passed into a hydrogenation zone containing a fixed bed of the catalyst type previously characterized. It is, of course, understood that the dehydrogenation zone may be one or more separate reactors with suitable heating means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in the liquid phase, a mixed liquid-vapor phase, or a vapor phase when they contact the catalyst, with best results obtained in the vapor phase.

Although hydrogen is the preferred diluent for use in the subject dehydrogenation method, in some cases other art-recognized diluents may be advantageously utilized such as steam, methane, carbon dioxide, and the like diluent. Hydrogen is preferred because it serves the dual-function of not only lowering the partial pressure of the dehydrogenatable hydrocarbon, but also of suppressing the formation of hydrogen-deficient, carbonaceous deposits on the catalytic composite. Ordinarily, hydrogen is utilized in amounts sufficient to insure a hydrogen to hydrocarbon mole ratio of about 1:1 to about 20:1, with best results obtained in the range of about 1.5:1 to about 10:1. The hydrogen stream charged to the dehydrogenation zone will typically be recycle hydrogen obtained from the effluent stream from this zone after a suitable hydrogen separation step.

Regarding the conditions utilized in the process of the present invention, these are generally selected from the conditions well known to those skilled in the art for the particular dehydrogenatable hydrocarbon which is charged to the process. More specifically, suitable conversion temperatures are selected from the range of about 700 to about 1250° F. with a value being selected from the lower portion of this range for the more easily dehydrogenated hydrocarbons such as the long chain normal paraffins and from the higher portion of this range for the more difficultly dehydrogenated hydrocarbons such as propane, butane, and the like hydrocarbons. For example, for the dehydrogenation of $C_6$ to $C_{30}$ normal paraffins, best results are ordinarily obtained at a temperature of about 800 to about 950° F. The pressure utilized is ordinarily selected at a value which is as low as possible consistent with the maintenance of catalyst stability and is usually about 0.1 to about 10 atmospheres with best results ordinarily obtained in the range of about .5 to about 3 atmospheres. In addition, a liquid hourly space velocity (calculated on the basis of the volume amount, as a liquid of hydrocarbon charged to the dehydrogenation zone per hour divided by the volume of the catalyst bed utilized) is selected from the range of about 1 to about 40 hr.$^{-1}$, with best results for the dehydrogenation of long chain normal paraffins typically obtained at a relatively high space velocity of about 25 to 35 hr.$^{-1}$.

Regardless of the details concerning the operation of the dehydrogenation step, an effluent stream will be withdrawn therefrom. This effluent will usually contain unconverted dehydroegnatable hydrocarbons, hydrogen, and products of the dehydrogenation reaction. This stream is typically cooled and passed to a hydrogen-separating zone wherein a hydrogen-rich vapor phase is allowed to separate from a hydrocarbon-rich liquid phase. In general, it is usually desired to recover the unreacted dehydogenatable hydrocarbon from this hydrocarbon-rich liquid phase in order to make the dehydrogenation process economically attractive. This recovery operation can be accomplished in any suitable manner known to the art such as by passing the hydrocarbon-rich liquid phase through a bed of suitable adsorbent material which has the capability to selectively retain the dehydrogenated hydrocarbons contained therein or by contacting same with a solvent having a high selectivity for the dehydrogenated hydrocarbon, or by a suitable fractionation scheme where feasible. In the case where the dehydrogenated hydrocarbon is a mono-olefin, suitable adsorbents having this capability are activated silica gel, activated carbon, activated alumina, various types of specially prepared molecular sieves, and the like adsorbents. In another typical case, the dehydrogenated hydrocarbons can be separated from the unconverted dehydrogenatable hydrocarbons by utilizing the inherent capability of the dehydrogenated hydrocarbons to easily enter into several well known chemical reactions such as alkylation, oligomerization, halogenation, sulfonation, hydration, oxidation, and the like reactions. Irrespective of how the dehydrogenated hydrocarbons are separated from the unreacted hydrocarbons, a stream containing the unreacted dehydrogenatable hydrocarbons will typically be recovered from this hydrocarbon separation step and recycled to the dehydrogenation step. Likewise, the hydrogen phase present in the hydrogen-separating zone will be withdrawn therefrom, a portion of it vented from the system in order to remove the net hydrogen make, and the remaining portion is typically recycled through suitable compressing means to the dehydrogenation step in order to provide diluent hydrogen therefor.

In a preferred embodiment of the present invention wherein long chain normal paraffin hydrocarbons are dehydrogenated to the corresponding normal mono-olefins, a preferred mode of operation of this hydrocarbon recovery step involves an alkylation reaction. In this mode, the hydrocarbon-rich liquid phase withdrawn from the hydrogen-separating zone is combined with a stream containing an alkylatable aromatic and the resulting mixture passed to an alkylation zone containing a suitable highly acid catalyst such as an anhydrous solution of hydrogen fluoride. In the alkylation zone the mono-olefins react with alkylatable aromatic while the unconverted normal paraffins remain substantially unchanged. The effluent stream from the alkylation zone can then be easily separated, typically by means of a suitable fractionation system, to allow recovery of the unreacted normal paraffins. The resulting stream of unconverted normal paraffins is then usually recycled to the dehydrogenation step of the present invention.

The following working examples are introduced to illustrate further the novelty, mode of operation, utility, and benefits associated with the dehydrogenation method of the present invention. These examples are intended to be illustrative rather than restrictive.

These examples are all performed in a laboratory scale dehydrogenation plant comprising a reactor, a hydrogen separating zone, a heating means, cooling means, pumping means, compressing means, and the like equipment. In this plant, the feed stream containing the dehydrogenatable hydrocarbon is combined with a hydrogen stream and the resultant mixture heated to the desired conversion temperature, which refers herein to the temperature maintained at the inlet to the reactor. The heated mixture is then passed into contact with the catalyst which is maintained as a fixed bed of catalyst particles in the reactor. The pressures reported herein are recorded at the outlet from the reactor. An effluent stream is withdrawn from the reactor, cooled, and passed into the hydrogen-separating zone wherein a hydrogen gas phase separates from a hydrocarbon-rich liquid phase containing dehydrogenated hydrocarbons, unconverted dehydrogenatable hydrocarbons, and a minor amount of side products of the dehydrogenation reaction. A portion of the hydrogen-rich gas phase is recovered as excess recycle gas with the remaining portion being continuously recycled through suitable compressive means to the heating zone as described above. The hydrocarbon-rich liquid phase from the separating zone is withdrawn therefrom and subjected to analysis to determine conversion and selectivity for the desired dehydrogenated hydrocarbon as will be indicated in the examples. Conversion numbers of the dehydrogenatable hydrocarbon reported herein are all calculated on the basis of disappearance of the dehydrogenatable hydrocarbon and are expressed in mole percent. Similarly, selectivity numbers are reported on the basis of moles of desired hydrocarbon produced per 100 moles of dehydrogenatable hydrocarbon converted.

All of the catalysts utilized in these examples are prepared according to the following general method with suitable modification in stoichiometry to achieve the compositions reported in each example. First, an alumina carrier material comprising $\frac{1}{16}$ inch spheres is prepared by: forming an alumina hydroxyl chloride sol by dissolving substantially pure aluminum pellets in a hydrochloric acid solution, adding hexamethylenetetramine to the sol, gelling the resulting solution by dropping it into an oil bath to form spherical particles of an alumina hydrogel, aging and washing the resulting particles with an ammoniacal solution and finally drying, calcining, and steaming the aged and washed particles to form spherical particles of gamma-alumina containing substantially less than 0.1 wt. percent combined chloride. Additional details as to this method of preparing this alumina carrier material are given in the teachings of U.S. Pat. No. 2,620,314. The resulting gamma-alumina particles are then contacted with an impregnation solution containing chloroplatinic acid, lead nitrate, and nitric acid in amounts sufficient to yield a final catalytic composite containing the desired amounts of platinum and lead. The nitric acid is utilized in an amount of about 3 wt. percent of the alumina particles. The impregnated spheres are then dried at a temperature of about 225° F. for about an hour and thereafter calcined in an air atmosphere at a temperature of about 500° F. to about 1000° F. for about 2 to 10 hours. In general, it is a good practice to thereafter treat the resulting calcined particles with an air stream containing about 10 to about 30% steam at a temperature of about 1000° F. for an additional period of about 5 hours in order to further reduce the residual combined chloride contained in the catalyst. In the cases shown in the example where the catalyst utilized contains an alkali component, this component is added to the oxidized and steam treated platinum- and lead-containing catalyst in a separate impregnation step. This second impregnation step involves contacting the oxidized particles with an aqueous solution of a suitable decomposable salt of the alkali component. For the catalyst utilized in the present examples, the salt is either lithium nitrate or potassium nitrate. The amount of the salt of the alkali metal utilized is chosen to result in a final catalyst of the desired composition. The resulting alkali impregnated particles are then dried and calcined in an air atmosphere in much the same manner as is described above following the first impregnation step.

In all of the examples the catalyst is reduced during start-up by contacting with hydrogen at an elevated temperature and thereafter sulfided with a mixture of $H_2$ and $H_2S$.

EXAMPLE I

The reactor is loaded with 100 cc. of a catalyst containing, on an elemental basis, 0.75 wt. percent platinum, 0.4 wt. percent lead and less than 0.15 wt. percent chloride. The feed stream utilized is commercial grade isobutane containing 99.7 wt. percent isobutane and 0.3 wt. percent normal butane. The feed stream is contacted with the catalyst at a temperature of 1065° F., a pressure of 10 p.s.i.g., a liquid hourly space velocity of 4.0 hr.$^{-1}$. and a hydrogen to hydrocarbon mole ratio of 2:1. The dehydrogenation plant is lined-out at these conditions and a 20 hour test period commenced. The hydrocarbon product stream from the plant is continuously analyzed by GLC (gas liquid chromatography) and a high conversion of isobutane is observed with a high selectivity for isobutylene.

EXAMPLE II

The catalyst contains, on an elemental basis, 0.375 wt. percent platinum, 0.25 wt. percent lead, 0.6 wt. percent lithium, and 0.15 wt. percent combined chloride. The feed stream is commercial grade normal dodecane. The dehydrogenation reactor is operated at a temperature of 870° F., a pressure of 10 p.s.i.g., a liquid hourly space velocity of 32 hr.$^{-1}$, and a hydrogen to hydrocarbon mole ratio of 8:1. After a line-out period a 20 hour test period is performed during which the average conversion of the normal dodecane is maintained at a high level with a selectivity for normal dodecene of about 90%.

EXAMPLE III

The catalyst is the same as utilized in Example II. The feed stream is normal tetradodecane. The conditions utilized are a temperature of 840° F., a pressure of 20 p.s.i.g., a liquid hourly space velocity of 32 hr.$^{-1}$. and a hydrogen to hydrocarbon mole ratio of 8:1. After a line-out period, a 20 hour test shows an average conversion of about 12.0%, and a selectivity for normal tetradodecene of about 90%.

EXAMPLE IV

The catalyst contains, on an elemental basis, 0.30 wt. percent platinum, 0.1 wt. percent lead, and 0.6 wt. percent lithium, with combined chloride being less than 0.2 wt. percent. The feed stream is substantially pure normal butane. The conditions utilized are a temperature of 950° F., a pressure of 15 p.s.i.g., a liquid hourly space velocity of 4.0 hr.$^{-1}$ and a hydrogen to hydrocarbon mole ratio of 4:1. After a line-out period, a 20 hour test is performed with an average conversion of the normal butane being about 30% and the selectivity for normal butane is about 80%.

EXAMPLE V

The catalyst contains, on an elemental basis, 0.75 wt. percent platinum, 0.25 wt. percent lead, 1.5 wt. percent potassium, and less than 0.2 wt. percent combined chloride. The feed stream is commercial grade ethylbenzene. The conditions utilized are a pressure of 15 p.s.i.g., a liquid hourly space velocity of 32 hr.$^{-1}$, a temperature of 1050° F., and a hydrogen to hydrocarbon mole ratio of 8:1. During a 20 hour test period, 85% of equilibrium conversion of the ethylbenzene is observed. The selectivity for styrene is about 95%.

It is intended to cover all changes and modifications of the above disclosure and examples which do not constitute departure from the spirit and scope of the invention as defined in the following claims.

I claim as my invention.

1. A catalytic composite comprising a combination of a platinum group component, a lead component, and an alkali or alkaline earth component with a porous carrier material wherein the platinum group component and the lead component are uniformly distributed throughout the porous carrier material, wherein the composite contains, on an elemental basis, about 0.01 to about 2 wt. percent of the platinum group metal and about 0.01 to about 5 wt. percent of the alkali metal or alkaline earth metal, and wherein the lead component is present in an amount sufficient to result in an atomic ratio of lead to the platinum group metal of about 0.05:1 to about 0.9:1.

2. A catalytic composite as defined in claim 1 wherein the platinum group component is platinum or a compound of platinum.

3. A catalytic composite as defined in claim 1 wherein said porous carrier material is a refractory inorganic oxide.

4. A catalytic composite as defined in claim 3 wherein said refractory inorganic oxide is alumina.

5. A catalytic composite as defined in claim 1 wherein said alkali metal component is a compound of potassium.

6. A catalytic composite as defined in claim 1 wherein said alkali metal component is a compound of lithium.

References Cited

UNITED STATES PATENTS

| | | | |
|---|---|---|---|
| 3,278,608 | 10/1966 | Clement | 252—466 |
| 3,315,007 | 4/1967 | Abell et al. | 252—466 |
| 3,425,792 | 2/1969 | Stephens | 252—466 |
| 3,477,962 | 11/1969 | Kardys | 252—412 |

CURTIS R. DAVIS, Primary Examiner

U.S. Cl. X.R.

252—472, 474; 260—668 D, 669, 683.3